H. N. AUGER.
CARPENTER'S TOOL.
APPLICATION FILED OCT. 26, 1911.
1,015,773.
Patented Jan. 30, 1912.
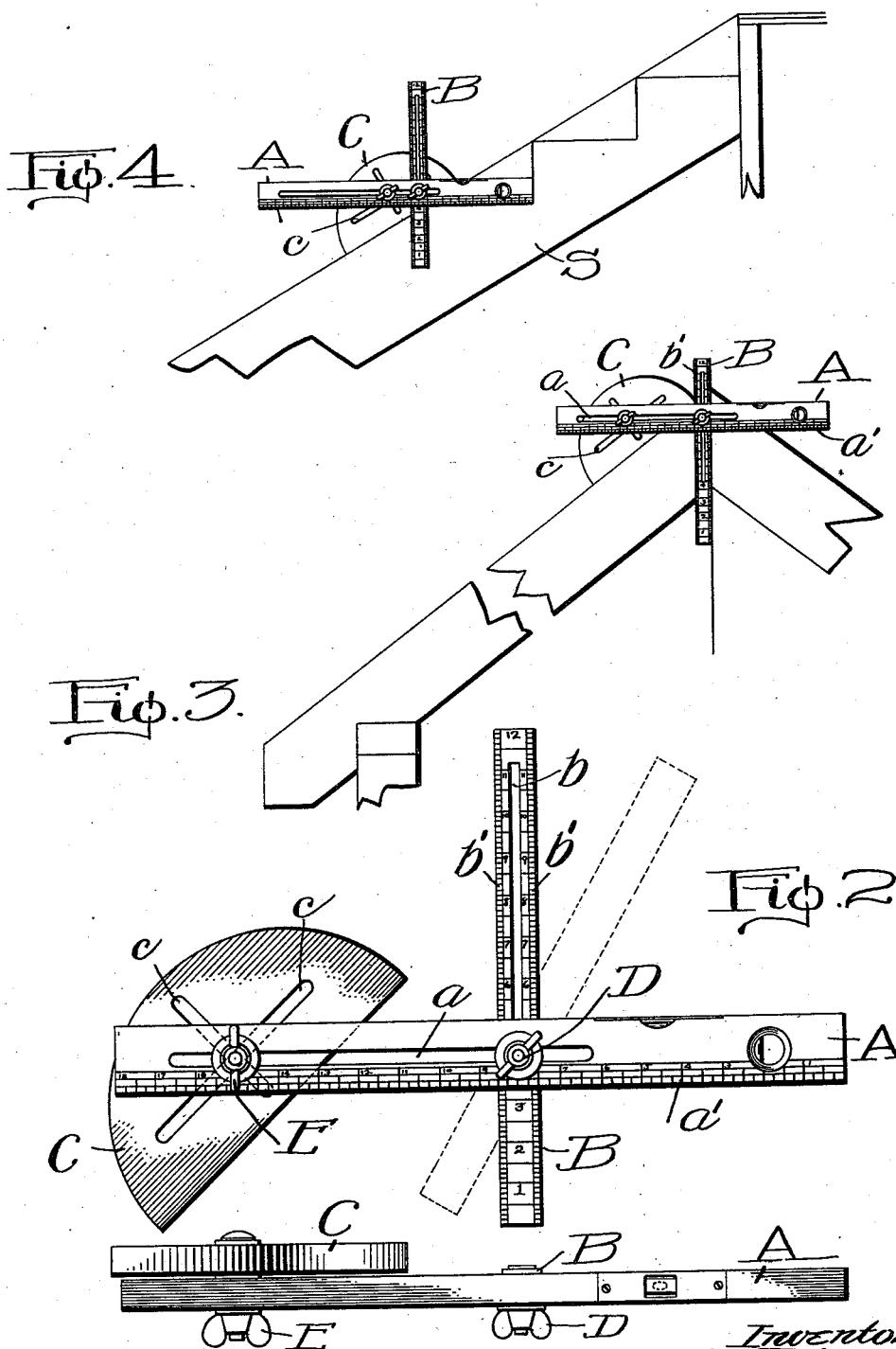

UNITED STATES PATENT OFFICE.

HENRY N. AUGER, OF WORCESTER, MASSACHUSETTS.

CARPENTER'S TOOL.

1,015,773.  Specification of Letters Patent.  Patented Jan. 30, 1912.

Application filed October 26, 1911. Serial No. 656,956.

*To all whom it may concern:*

Be it known that I, HENRY N. AUGER, a citizen of the United States, residing at Worcester, in the county of Worcester and State of Massachusetts, have invented a new and useful Carpenter's Tool, of which the following is a specification.

The principal objects of this invention are to provide a device of this character with simple and convenient means whereby when a level and scale are set up at right angles to each other their relations to the inclined straight edge of a stringer or rafter can be conveniently fixed so that the whole tool can be moved along the stringer or rafter to different positions in all of which the level will remain horizontal and the scale vertical; also to provide a tool of this character of such simple construction that it consists of only three main parts and is capable of greatly shortening the time of marking stair stringers and also is capable of saving time in getting the miter for roof rafters and on other similar work.

Further objects and advantages of the invention will appear hereinafter.

Reference is to be had to the accompanying drawings, in which—

Figure 1 is a plan of a combination tool constructed in accordance with this invention. Fig. 2 is a side elevation thereof; Fig. 3 is a side elevation showing a pair of rafters and illustrating how the tool is to be used thereon; and Fig. 4 is a similar view showing how the tool is used to mark stair stringers.

The invention is shown in a simple form in which it comprises a level A, a scale B, and an angle block C. Both the scale and angle block are adjustable along the level toward and from each other, and the former is adjustable longitudinally. The level is constructed like ordinary levels except that it is provided with a longitudinal slot $a$ and has a scale $a'$ along one edge. The movable scale B is provided with a longitudinal slot $b$ and with scales $b'$ along opposite edges. The angle block is provided with crossing slots $c$. Fastening devices D and E are provided in the form of bolts with winged nuts thereon for securing the scale and angle block to the level in adjusted positions.

In the use of the device for marking stair treads, it is necessary only to set the scale B along the level until its inner edge, that is, its right hand edge in the figures, coincides with the division on the scale $a'$ which represents the length of the stair tread, as for example, in Fig. 4, it is set for a tread seven inches wide. The scale B is also adjusted vertically into such position that the amount of the scale projecting below the lower straight edge of the level shall represent the height of the tread, as for example, in this case four inches. Then the two straight edges are brought to a true right angle by means of a square, and these two parts fastened by the fastening device D. This having been done, the instrument is put up against the stringer S and the level brought to level position and to the position of one of the stair treads, as for example, the top one, and then the angle block C which has been loosened is brought up to engage with the upper inclined edge of the stringer. Then it is fastened in position. After this is done the top of the top tread and the vertical front thereof are marked off and then the instrument is moved along down the stringer until the bottom of the level comes to the proper position, that is, to the bottom of the vertical line. Then the next tread is marked and so on.

The manner of using the device for getting the miter on a roof is illustrated in Fig. 3, and will be obvious from what has been stated in connection with Fig. 4.

Although I have illustrated and described a preferred embodiment of the invention, I am aware that many modifications can be made therein by any person skilled in the art without departing from the scope of the invention as expressed in the claims. Therefore I do not wish to be limited to all the details of construction herein shown and described, but What I do claim is:—

1. In a tool of the class described, the combination of a level having a longitudinal slot therein and provided with a scale along one edge, a movable scale connected with the level through said slot and adapted to be set at an angle to the edge of the level, and an angle block connected with the level through said slot and having a straight edge adapted to be set at an angle to the level.

2. In a device of the character described, the combination of a level, a scale adjustable longitudinally and angularly on a level, means for securing the level and scale together in adjusted positions, an angle block having a straight edge and adjustable angularly and along the level toward and from the scale, and means for securing the block and level together in adjusted angular positions.

3. In a device of the character described, the combination of a level having a longitudinal slot from a point near one end to a point near the center thereof, a double edged scale having a longitudinal slot at one end, means extending through both of said slots for securing the level and scale together in adjusted angular positions, a semi-circular angle block having a straight edge and provided with crossing slots, and means extending through the crossing slots and through the slot in the level for securing the angle block to the level in adjusted angular positions.

In testimony whereof I have hereunto set my hand, in the presence of two subscribing witnesses.

HENRY N. AUGER.

Witnesses:
JAMES O'BRIEN,
JOSEPH S. FRESHETTE.

Copies of this patent may be obtained for five cents each, by addressing the "Commissioner of Patents, Washington, D. C."